US012563328B2

(12) United States Patent
Shumaker et al.

(10) Patent No.: US 12,563,328 B2
(45) **Date of Patent: *Feb. 24, 2026**

(54) TEXTILE ASSEMBLIES FOR SPEAKERS, INCLUDING TEXTILE ASSEMBLIES WITH INLAID TENSIONING YARNS, AND ASSOCIATED APPARATUSES AND METHODS

(71) Applicant: Google LLC, Mountain View, CA (US)

(72) Inventors: Laura Charlotte Shumaker, Sunnyvale, CA (US); Siddhartha Hegde, San Jose, CA (US); Anuja Bagul, Palo Alto, CA (US); Darren Torrie, Mountain View, CA (US); Myrrhia R. Resneck, San Francisco, CA (US); Adam Duckworth Mittleman, Redwood City, CA (US); Aditya Narayanan, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 612 days.

This patent is subject to a terminal disclaimer.

(21) Appl. No.: 17/979,184

(22) Filed: Nov. 2, 2022

(65) Prior Publication Data

US 2023/0046444 A1 Feb. 16, 2023

Related U.S. Application Data

(63) Continuation of application No. 17/632,310, filed as application No. PCT/US2021/022334 on Mar. 15, 2021, now Pat. No. 11,606,632.

(Continued)

(51) Int. Cl.

| | |
|---|---|
| ***H04R 1/02*** | (2006.01) |
| ***D04B 1/16*** | (2006.01) |
| ***D04B 21/16*** | (2006.01) |

(52) U.S. Cl.

CPC .............. *H04R 1/023* (2013.01); *D04B 1/16* (2013.01); *D04B 21/16* (2013.01)

(58) Field of Classification Search

CPC ...................................................... H04R 1/023

(Continued)

(56) References Cited

U.S. PATENT DOCUMENTS

| | | |
|---|---|---|
| 4,244,096 A | 1/1981 | Kashichi |
| 9,743,194 B1 | 8/2017 | Maclean |

(Continued)

FOREIGN PATENT DOCUMENTS

| | | |
|---|---|---|
| CN | 207581058 U | 7/2018 |
| JP | S50153940 | 12/1975 |

(Continued)

OTHER PUBLICATIONS

English Translation JP H1118185A (Year: 1999).*

(Continued)

*Primary Examiner* — Jenna L Johnson

(74) *Attorney, Agent, or Firm* — Lerner David LLP

(57) ABSTRACT

This document describes textile assemblies for speakers, including textile assemblies with inlaid tensioning yarns, and associated apparatuses and methods. The textile assembly includes a textile body (106) with inlaid tensioning yarns (302, 304). The textile assembly (102) may be a fully-fashioned textile swatch. The tensioning yarns are inlaid at intervals in the textile body but can slide within or be pulled through the textile body. Further, the tensioning yarns have ends (306, 308, 402, 404) that are accessible near the edges of the textile body for various reasons. First, pulling on them while the textile assembly is on an acoustic device (104) tensions the tensioning yarns such that they limit movement of the textile assembly and break up vibration modes. Second, their ends can be tied directly to, formed into loops (Continued)

to hook over, or wound around, features (208) on the acoustic device to removably secure the textile assembly to the acoustic device.

19 Claims, 8 Drawing Sheets

Related U.S. Application Data

(60) Provisional application No. 63/011,754, filed on Apr. 17, 2020.

(58) Field of Classification Search
USPC .......................................................... 381/391
See application file for complete search history.

(56) References Cited

U.S. PATENT DOCUMENTS

| | | | | |
|---|---|---|---|---|
| 11,606,632 | B2 * | 3/2023 | Shumaker | H04R 1/023 |
| 2009/0100654 | A1 | 4/2009 | Carps | |
| 2010/0282536 | A1 | 11/2010 | Carps | |
| 2012/0233882 | A1 | 9/2012 | Huffa et al. | |
| 2014/0196316 | A1 | 7/2014 | Follet | |
| 2015/0208148 | A1 | 7/2015 | Busenitz | |
| 2017/0196303 | A1 | 7/2017 | Davis et al. | |

FOREIGN PATENT DOCUMENTS

| | | |
|---|---|---|
| JP | S56157887 | 11/1981 |
| JP | H1118185 A * | 1/1999 |
| WO | WO 2019231375 | 12/2019 |

OTHER PUBLICATIONS

Examination Report dated May 14, 2022 in AU Patent Application No. 2021257725.

International Search Report and Writted Opinion dated Jul. 1, 2021 in International Patent Application No. PCT/US2021/022334.

Office Action dated Apr. 25, 2022 in CA Patent Application No. 3,148,463.

Office Action dated Jul. 20, 2022 in KR Patent Application No. 10-2022-7009941.

Office Action dated Aug. 8, 2022 in U.S. Appl. No. 17/632,310.

* cited by examiner

TEXTILE ASSEMBLIES FOR SPEAKERS, INCLUDING TEXTILE ASSEMBLIES WITH INLAID TENSIONING YARNS, AND ASSOCIATED APPARATUSES AND METHODS

CROSS-REFERENCE TO RELATED APPLICATIONS

The present application is a continuation of U.S. patent application Ser. No. 17/632,310, filed Feb. 2, 2022, which is a national stage application under 35 U.S.C. § 371 of International Patent Application No. PCT/US2021/022334, filed Mar. 15, 2021, which claims the benefit of U.S. Provisional Application Ser. No. 63/011,754, filed Apr. 17, 2020, each of which is incorporated by reference herein in its entirety.

BACKGROUND

Textile coverings for speakers provide protection over a speaker-driver component from ingress of blunt objects, a cosmetic surface that blends into home aesthetics, and an opportunity for brand expression. However, these textiles typically interact with sound waves produced by the speaker driver. This may result in acoustic distortion that degrades a listening experience or introduces unpredictable effects into algorithms intended to separate speaker signals from microphone signals for the purposes of voice commands. Textiles that have sufficient visual opacity (to hide engineering features from a user) are typically also less acoustically transmissive and more prone to introducing distortion. Proper constraint of the textile's movement can satisfactorily resolve the tradeoff between necessary visual opacity and low distortion. If one considers the textile like a drumhead, proper constraint can be understood as stiffening the drumhead to increase the resonant frequency and reduce the movement of the textile.

One way to add constraint is by adding adhesive between the textile and a plastic part (e.g., "grille") that supports the textile over the speaker-driver component, either over the entire grille or in select areas. This may have several downsides, however. First, adhesive processes may add cost to the assembly and may require a high level of sophistication on the part of manufacturers producing the design. Second, subsequent reworking or recycling of parts made or assembled using adhesive processes may be difficult. Third, the adhesive can discolor textiles or be visible through them, which may lead to increased scrap rates or compromised cosmetics. Finally, adhesives typically used to add constraint between the textile and the plastic part are typically thermoplastic, which risks debanding in the final assembly and therefore compromising reliability if exposed to changes in environmental temperature.

Another way to add constraint is to stretch the textile part during assembly to increase its stiffness. This stretching is usually done in conjunction with an adhesive application. However, as discussed above, adhesives can be difficult to rework. Thus, it may not be possible to address insufficient stretching after assembly, which is when a device is tested for acoustic performance.

SUMMARY

This document describes textile assemblies for speakers, including textile assemblies with inlaid tensioning yarns, and associated apparatuses and methods. The textile assembly includes a textile body with inlaid tensioning yarns. In aspects, the textile assembly may be a fully-fashioned textile swatch. The tensioning yarns are inlaid at intervals in the textile body but can slide within or be pulled through the textile body. Further, the tensioning yarns have ends that are accessible near the edges of the textile body for various reasons. First, pulling on them while the textile assembly is on an acoustic device tensions the tensioning yarns such that they limit movement of the textile assembly and break up vibration modes. Second, their ends can be tied directly to, formed into loops to hook over, or wound around features on the acoustic device, such as the housing or other structural parts. This removably secures the textile assembly to the acoustic device, allowing for removal of the textile assembly from the acoustic device.

In aspects, a textile assembly is disclosed. The textile assembly includes a speaker grille, a textile body, and a plurality of tensioning yarns. The speaker grille has multiple anchors. The plurality of tensioning yarns are connected to the textile body. One or more tensioning yarns of the plurality of tensioning yarns are disposed back-and-forth across the textile body at predefined intervals to form a plurality of loop ends that extend beyond opposing edges of the textile body. The loop ends are accessible to removably connect to anchors on the speaker grille to secure the textile body to the speaker grille and enable removal of the textile body from the speaker grille. The one or more tensioning yarns are also configured to slidably move relative to at least a portion of the textile body to enable adjustment of a tension of the one or more tensioning yarns.

In aspects, a speaker is disclosed. The speaker includes a speaker driver, a speaker grille, and a textile assembly. The speaker grille has multiple anchors. The textile assembly is removably secured to the speaker grille. Also, the textile assembly includes a textile body and a plurality of tensioning yarns inlaid within the textile body. One or more tensioning yarns of the plurality of tensioning yarns are inlaid back-and-forth across the textile body. The one or more tensioning yarns have loop ends that extend beyond an edge of the textile body between successive inlays and are removably connected to the anchors on the speaker grille to secure the textile assembly to the speaker grille and enable removal of the textile assembly from the speaker grille. In addition, the one or more tensioning yarns are configured to slidably move relative to at least a portion of the textile body to enable adjustment of a tension applied to the one or more tensioning yarns.

This summary is provided to introduce simplified concepts concerning textile assemblies for speakers, including textile assemblies with inlaid tensioning yarns, and associated apparatuses and methods, which are further described below in the Detailed Description. This summary is not intended to identify essential features of the claimed subject matter, nor is it intended for use in determining the scope of the claimed subject matter.

BRIEF DESCRIPTION OF THE DRAWINGS

The details of one or more aspects of textile assemblies for speakers, including textile assemblies with inlaid tensioning yarns, and associated apparatuses and methods are described in this document with reference to the following drawings. The same numbers are used throughout the drawings to reference like features and components:

FIGS. 6-1 and 6-2 illustrate front and back views, respectively, of example textile swatch with inlaid tensioning yarns.

DETAILED DESCRIPTION

Overview

Figure 1:
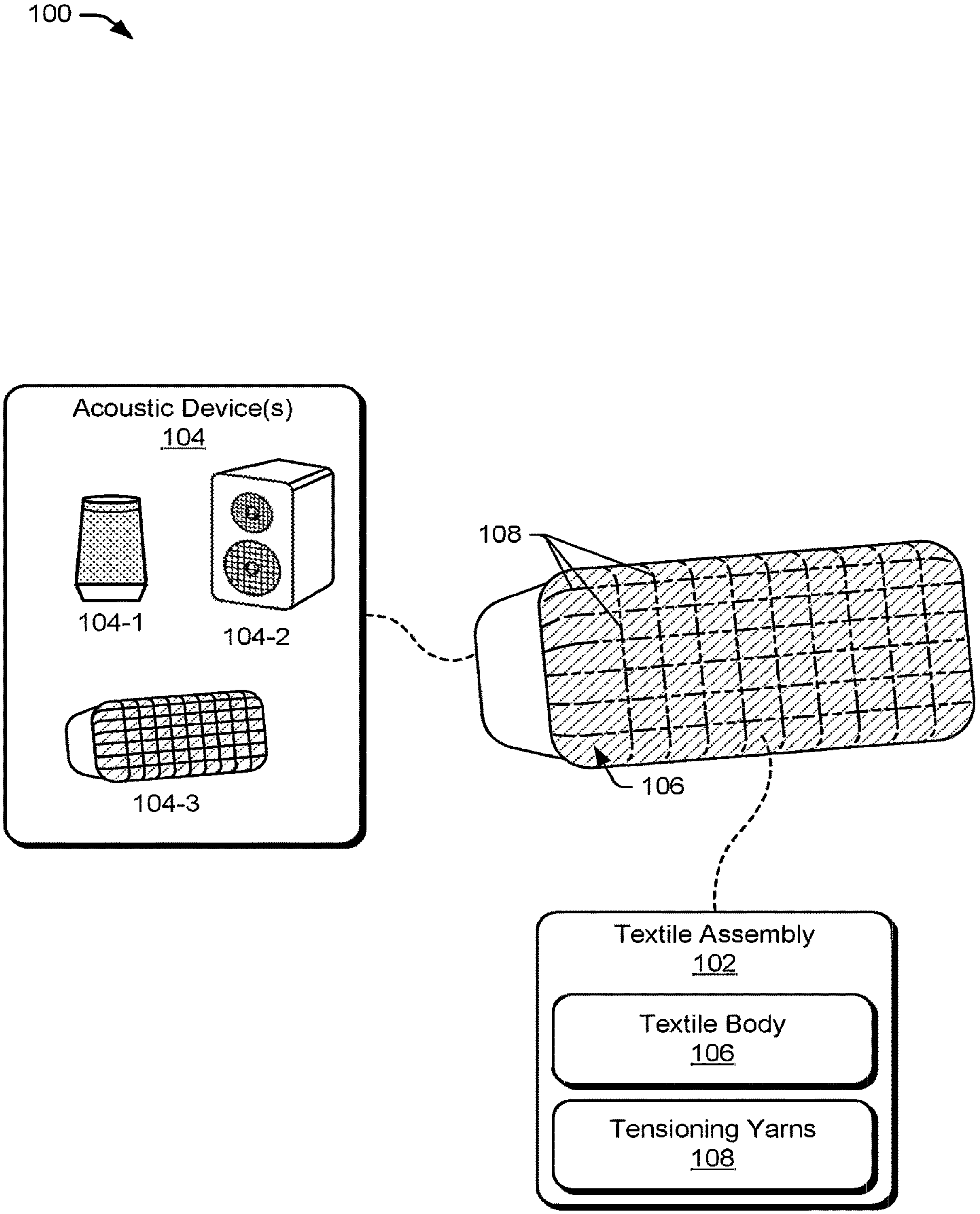
FIG. 1 illustrates an example implementation of a textile assembly mounted to an acoustic device.

This document describes textile assemblies for speakers, including textile assemblies with inlaid tensioning yarns, and associated apparatuses and methods. In particular, a textile body is created, which is configured to cover an acoustic device's speaker (and potentially other areas of the acoustic device) and provide a desired cosmetic finish. The textile assembly also includes tensioning yarns inlaid at intervals in the textile body. The tensioning yarns may be fabric yarns, filaments, cords, narrow tapes, or similar "1-dimensional" components, which are connected to the textile body.

The tensioning yarns may be connected to the textile body via a variety of different processes including, for example, by being stitched or threaded through the textile body, woven through the textile body, stitched over with an embroidery machine, threaded through tubes formed by additional fabric stitched or bonded to the textile body, or inlaid by a knitting machine. At least some of the tensioning yarns are free to slide relative to the textile body, enabling the tensioning yarn to slide within or be pulled through the textile body. The tensioning yarns may have one or more portions that are free to slide and one or more other portions that are not slidable (e.g., fixed to the textile body), or the tensioning yarns may be completely free along their entire length to slide relative to the textile body.

The tensioning yarns have ends that are accessible to adjust the tensioning yarns and to removably connect (e.g., hook to, loop over, wind around, tie to) to features on the acoustic device, such as protrusions, hooks, tabs, knobs, and so on. Alternatively, the ends of the tensioning yarns can be fixed to the features on the acoustic device, such as by being glued, welded, or otherwise adhered to the features. The features may be disposed on a component of the acoustic device, such as a housing, a speaker grille, or other suitable hardware part of the acoustic device. In aspects, one or more of the tensioning yarns may be disposed back-and-forth across the textile body, and thus in front of a face of the speaker-driver component, at predefined intervals to form a plurality of loop ends that extend beyond opposing edges of the textile body. The ends of the tensioning yarns can be disconnected from the features on the acoustic device to easily remove the textile assembly from the acoustic device. Connecting the ends of the tensioning yarns to the features of the acoustic device removably secures the textile assembly to the acoustic device. In an alternative implementation, the ends of the tensioning yarns at one edge of the textile body may be connected (e.g., tied, looped, hooked, etc.) to the ends of the tensioning yarns at the opposite edge of the textile body, such that the tensioning yarns connect to themselves and wrap the acoustic device or the component of the acoustic device.

Tension can be applied to the tensioning yarns. Pulling on a tensioning yarn during assembly of the textile assembly onto, for example, the speaker grille increases a tension of the tensioning yarn across a face of the speaker grille. Increased tension of the tensioning yarn reduces movement of the textile assembly, such as by dampening vibration of the textile body that is caused by acoustic pressure passing through the textile assembly. Dampening the vibration response of the textile body to the acoustic pressure reduces acoustic distortion that typically results from the acoustic pressure vibrating the textile body. Further, while the tensioning yarns constrain the textile body based on the tension applied to the tensioning yarns (e.g., the stiffness of the tensioning yarns under tension resists vibration), the textile body is not under the same tension as the tensioning yarns because the tensioning yarns are free to slide relative to the textile body without applying the same tension to the textile body or at least a portion of the textile body. As such, applying tension to the tensioning yarns may cause some tension to also be applied to the textile body, but to a lesser degree, due to friction between the tensioning yarns and the textile body. Accordingly, the tension applied to the tensioning yarns is substantially greater than the tension applied to the textile body.

The tensioning yarns are inlaid in one or more non-parallel directions in the textile part. In some aspects, the tensioning yarns are inlaid in two substantially orthogonal directions (e.g., vertical and horizontal). The tensioning yarns can be visible on a front of the textile part, on a back of the textile part, hidden from view between two layers of the textile part, or have a combination of hidden and visible portions on the front or back, or both the front and back, of the textile part.

These are but a few examples of how the described techniques and devices may be used to enable textile assemblies for speakers, including textile assemblies with inlaid tensioning yarns, and associated apparatuses and methods. Other examples and implementations are described throughout this document. The document now turns to an example device.

Example Device

FIG. 1 illustrates an example implementation 100 of a textile assembly 102 mounted to an acoustic device 104. The acoustic device 104 can be any suitable acoustic device, which is configured to generate audio output and/or receive audio input. The acoustic device 104 may include one or more speaker-driver components for generating audio output and/or one or more audio sensors for receiving audio input. Some example acoustic devices include a "smart" speaker 104-1, a speaker 104-2, and a speaker 104-3. The textile assembly 102 includes a textile body 106 that covers a face of the acoustic device 104.

The textile body 106 also includes tensioning yarns 108, which are inlaid in the textile body 106. The tensioning yarns 108 can be hidden within the textile body 106, or at least partially visible on the front and/or back of the textile body 106. The tensioning yarns 108 can be inlaid in the textile body 106 via a knitting process, a weaving process, or a sewing process. The textile body 106 maintains inlay position for the tensioning yarns 108 based on how the tensioning yarns 108 are inlaid in the textile body 106 or how the textile body is constructed.

Using the tensioning yarns 108, the textile assembly 102 can be mounted to the acoustic device 104 without using adhesive. Further, as is described in more detail below, the tensioning yarns 108 can be tensioned to particular tension (s). This may reduce acoustic distortion, which is caused by vibration of the textile body 106 when exposed to acoustic pressure (e.g., audio output by the acoustic device 104 or audio input received by an audio sensor of the acoustic device 104). The tensioning yarns 108 can reduce the acoustic distortion, associated with the vibration of the textile body 106, even if the textile assembly 102 is not positioned directly in front of the speaker-driver component (s) or the audio sensor(s).

Figure 2:
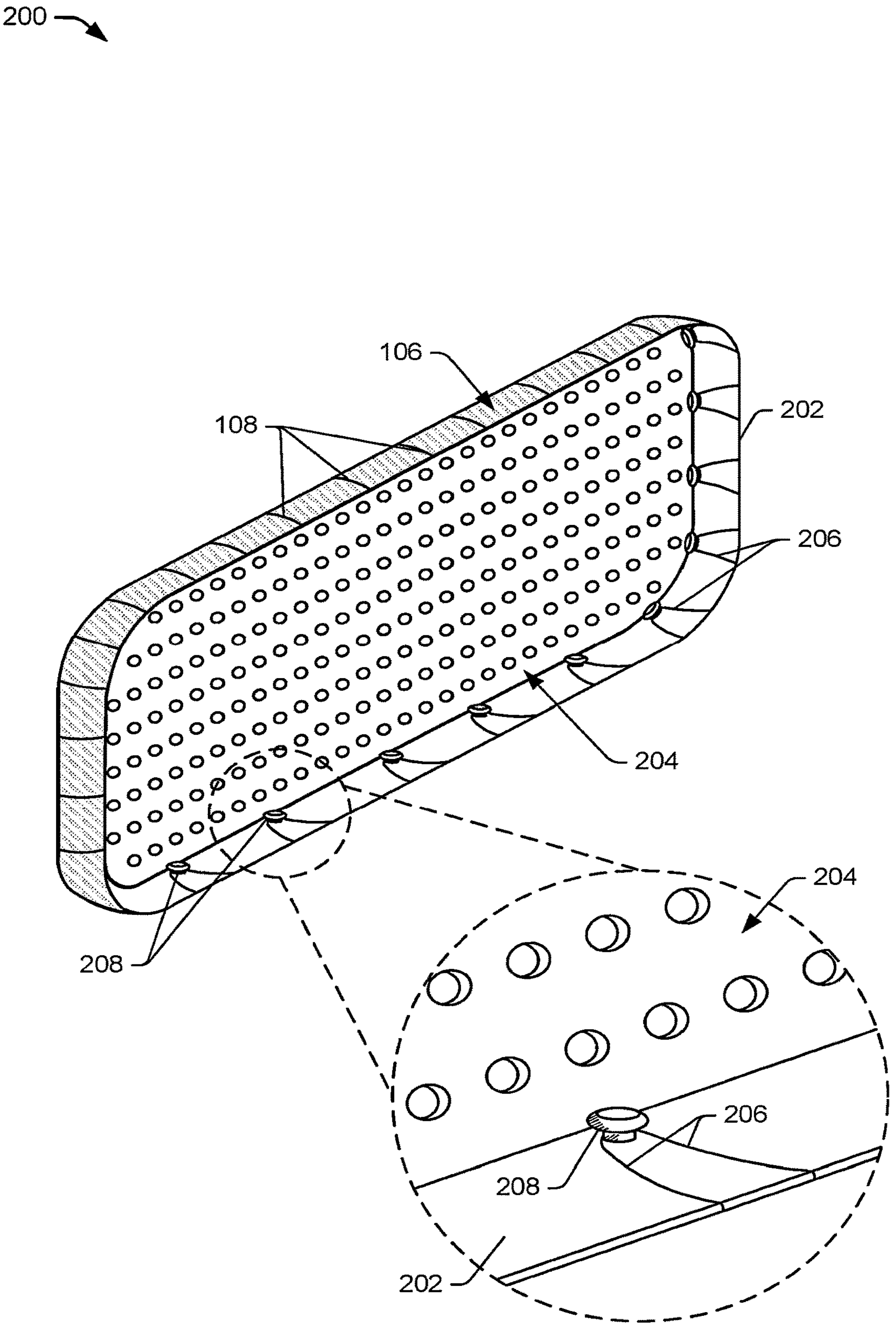
FIG. 2 illustrates a rear view of an example implementation of a textile assembly removably secured to a speaker grille of the acoustic device from FIG. 1.

FIG. 2 illustrates a rear view 200 of an example implementation of the textile assembly 102 removably secured to a speaker grille of the acoustic device from FIG. 1. In the illustrated example, the textile assembly 102 is mounted to a speaker grille 202 of the acoustic device 104. The speaker grille 202 can include a hard grille, which may include a stiff material 204 (e.g., plastic, metal), with a plurality of holes or cutouts, positioned across a center area of the speaker grille 202 to allow audio output or audio input (e.g., voice command) to pass through. Alternatively, the speaker grille 202 can be open, such as a frame with an open center area. Any suitable speaker grille 202 can be used. For example, although the illustrated example shows the speaker grille 202 having a substantially rectangular shape without rounded corners and edges, the speaker grille 202 can have any suitable shape, including circular, square, oblong, trapezoidal, spherical, obround, and so forth.

The textile assembly 102 acts as a fabric cover for the speaker grille 202 that can aesthetically blend into a user's home and also provide an indication of permeability representing a location of a speaker-driver component (e.g., speaker) or a location of an audio sensor (e.g., microphone). Additionally, the textile assembly 102 helps to protect the speaker-driver component of the acoustic device.

FIG. 2 illustrates that the tensioning yarns 108 are inlaid within the textile body 106. The tensioning yarns 108 include ends 206 that extend beyond an edge of the textile body and are accessible to removably connect to features 208 on the speaker grille 202 or on other areas of the acoustic device 104. For example, the textile assembly 102 can be mounted or secured to the front of the speaker grille 202 using the tensioning yarns 108 to hook, loop, tie, or otherwise connect to the features 208 on the speaker grille 202. The features 208 on the speaker grille 202 can include any suitable feature that allows removable connection to the tensioning yarns 108, such as protrusions, hooks, knobs, cutouts (e.g., curved slots with cantilever-type edges), and so forth. For illustration purposes, FIG. 2 shows the features 208 as protrusions over which the tensioning yarns 108 can loop around. The features 208 are illustrated as being disposed on an interior surface of the speaker grille 202. However, the features 208 may be disposed on an exterior surface of the speaker grille or other area of the acoustic device 104. Although the implementations described herein use the speaker grille 202, the textile assembly 102 may be assembled to any suitable component of the acoustic device 104 or area on the housing the acoustic device 104.

As is described in more detail below, the tensioning yarns 108 can slidably move along their length through the textile body 106 to enable the tensioning yarns 108 to be pulled tight across the face of the speaker grille 202 and be removably connected to the features 208 on the speaker grille. In aspects, the tensioning yarns 108 include a first set of tensioning yarns configured to slidably move in a first direction and a second set of tensioning yarns configured to slidably move in a second direction different than the first direction.

Figure 3:
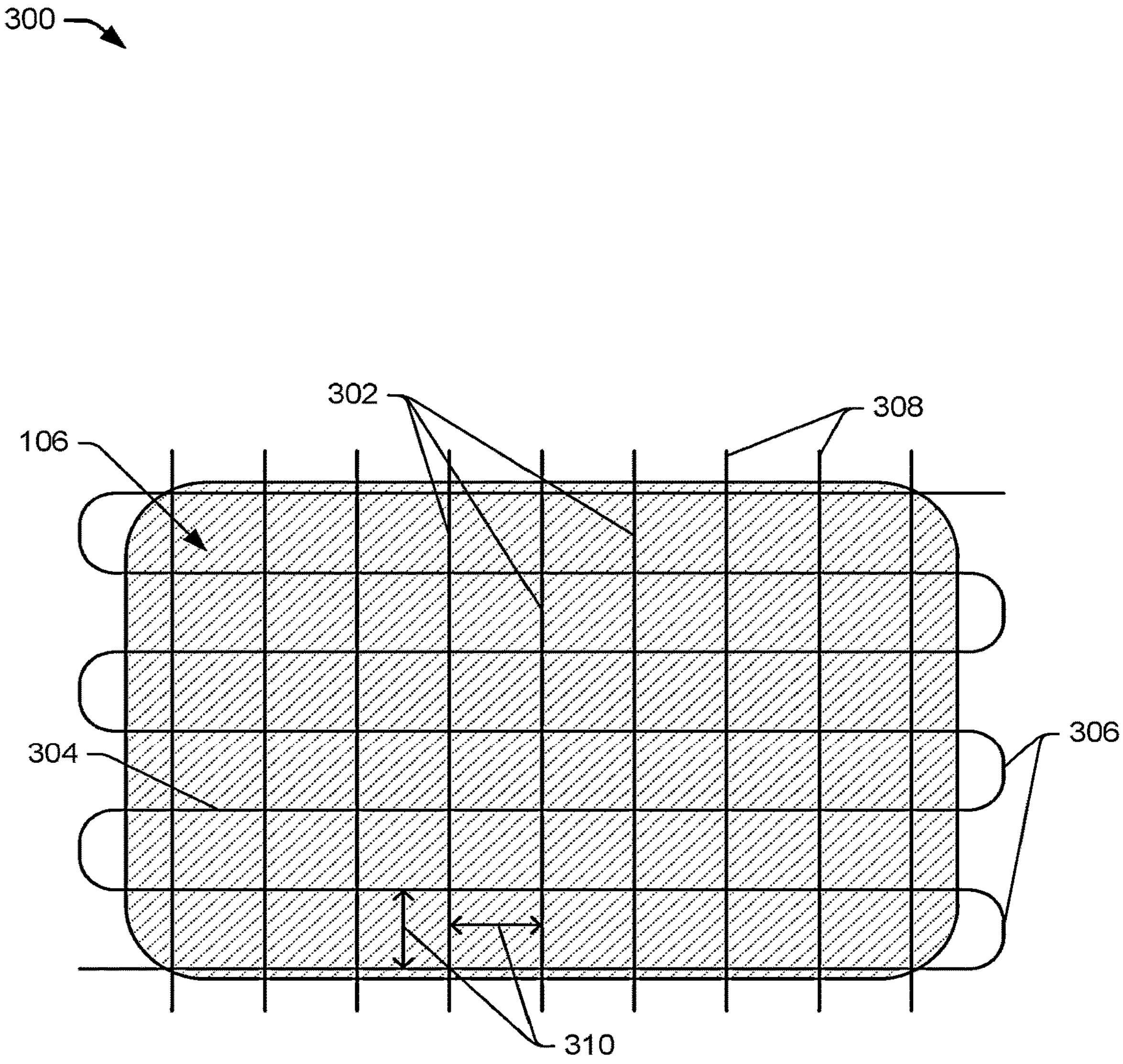
FIG. 3 illustrates a textile assembly with a textile body, a plurality of vertically-inlaid tensioning yarns, and a single horizontally-inlaid tensioning yarn.
Figure 4:
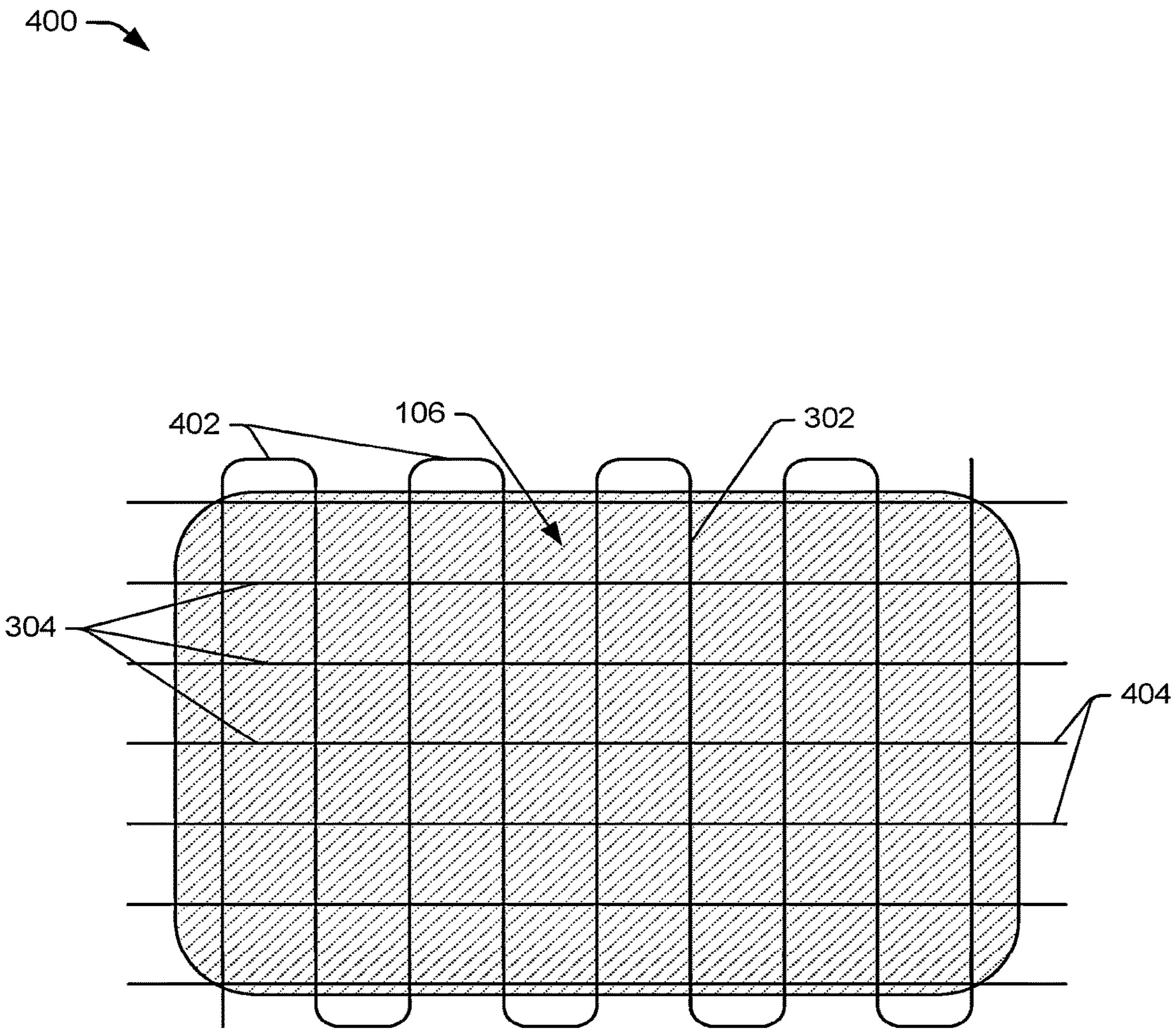
FIG. 4 illustrates the textile assembly with a textile body, a plurality of horizontally-inlaid tensioning yarns, and a single vertically-inlaid tensioning yarn.
Figure 5:
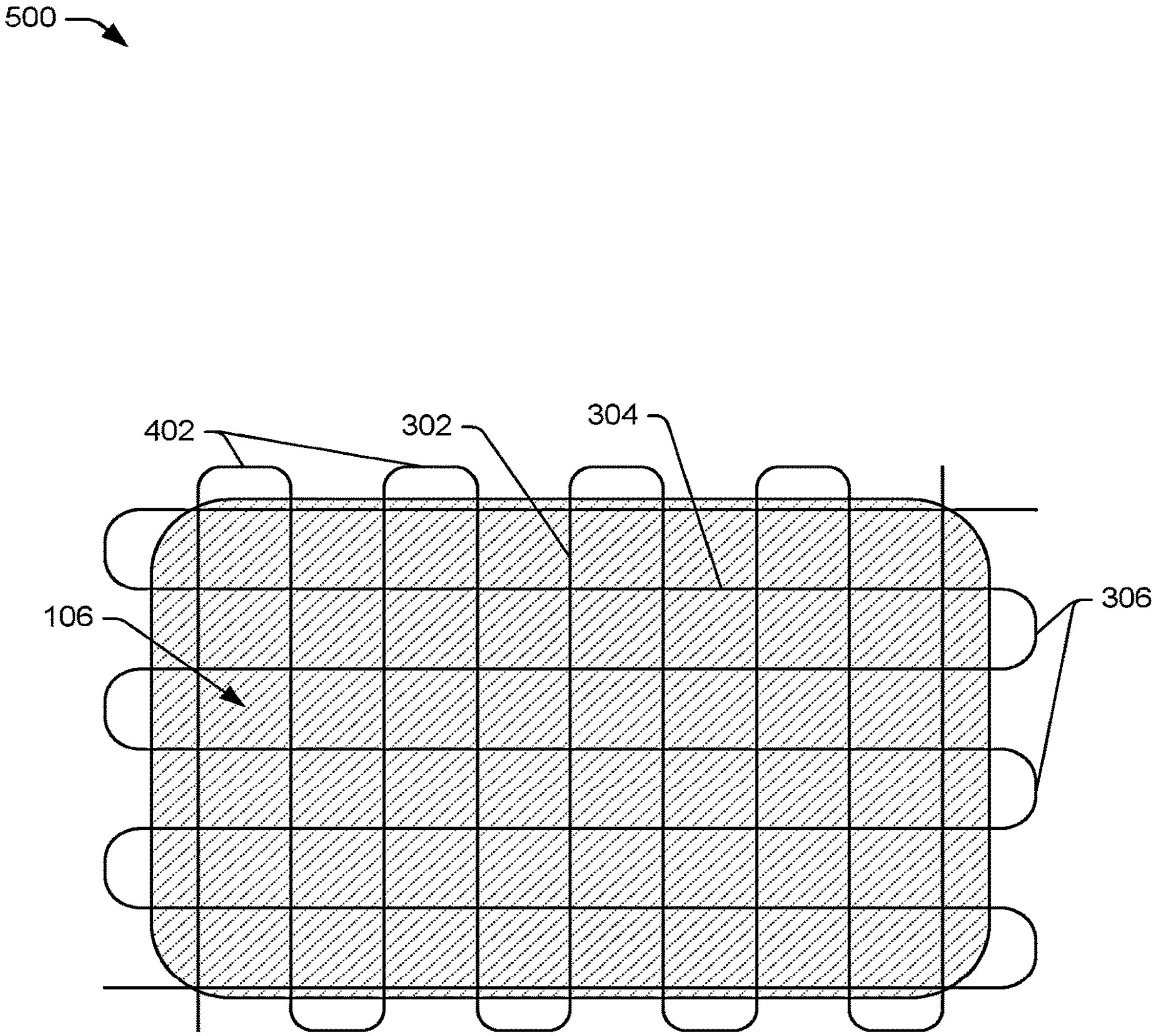
FIG. 5 illustrates the textile assembly with a textile body, a single vertically-inlaid tensioning yarn, and a single horizontally-inlaid tensioning yarn.

FIGS. 3 through 5 illustrate various example implementations 300, 400, 500, respectively, of the textile assembly 102 from FIG. 1. In FIG. 3, the textile assembly 102 is illustrated with the textile body 106, a plurality of vertically-inlaid tensioning yarns 302, and a single horizontally-inlaid tensioning yarn 304. FIG. 4 illustrates the textile assembly 102 with the textile body 106, a plurality of horizontally-inlaid tensioning yarns 304, and a single vertically-inlaid tensioning yarn 302. FIG. 5 illustrates the textile assembly 102 with the textile body 106, a single vertically-inlaid tensioning yarn 302, and a single horizontally-inlaid tensioning yarn 304.

Another implementation may include a plurality of vertically-inlaid tensioning yarns 302 and a plurality of horizontally-inlaid tensioning yarns 304. Alternatively, the textile assembly 102 may include one or more tensioning yarns inlaid in a single direction. Although the described implementations use horizontal and vertical directions for the tensioning yarns, any suitable direction across the speaker grille 202 may be used. Also, the tensioning yarns may be inlaid in different directions that are non-orthogonal to one another. As illustrated in FIGS. 3, 4, and 5, the inlaid tensioning yarns may be substantially orthogonal to one another, such as being arranged to approximately within 15 degrees of orthogonality.

In FIG. 3, the horizontally-inlaid tensioning yarn 304 is disposed back-and-forth across the textile body 106 (in a horizontal direction) to form loop ends 306 configured to loop around the features on the acoustic device 104, such as the features 208 on the speaker grille 202. The loop ends 306 may extend beyond the edge of the textile body 106 between successive inlays of the horizontally-inlaid tensioning yarn 304. In addition, the vertically-inlaid tensioning yarns 302 include open ends 308 configured to be tied to, or around, the features on the acoustic device 104, such as the features 208 on the speaker grille 202. Loop ends 306 and open ends 308 are instances of ends 206 from FIG. 2.

In FIG. 4, the vertically-inlaid tensioning yarn 302 is disposed back-and-forth across the textile body 106 (in a vertical direction) to form loop ends 402 configured to loop around the features on the acoustic device 104. The loop ends 402 may extend beyond the edge of the textile body 106 between successive inlays of the vertically-inlaid tensioning yarn 302. In addition, the horizontally-inlaid tensioning yarns 304 include open ends 404 configured to be tied to, or around, the features on the acoustic device 104. Loop ends 402 and open ends 404 are instances of ends 206 from FIG. 2.

In FIG. 5, the vertically-inlaid tensioning yarn 302 is disposed back-and-forth across the textile body 106 in a vertical direction to form the loop ends 402 and the horizontally-inlaid tensioning yarn 304 is disposed back-and-forth across the textile body 106 in a horizontal direction to form the loop ends 306. Alternatively, one implementation may include both the plurality of vertically-inlaid tensioning yarns 302, independently disposed in the vertical direction and having open ends 308, and the plurality of horizontally-inlaid tensioning yarns 304, independently disposed in the horizontal direction and having open ends 404.

At least some of the inlaid tensioning yarns are substantially parallel to one another and separated by a distance 310.

Any suitable distance can be used for the distance 310 between the inlaid tensioning yarns. In one example, the distance 310 is within a range of approximately 1.5 centimeters (cm) to approximately 3 cm, such as approximately 2 cm. Spacing the tensioning yarns 108 as such, in combination with the tension on the tensioning yarns 108, can mitigate effects of acoustic distortion by breaking up vibration modes and limiting movement of the textile body 106 without applying the same tension to the textile body 106. In an example, the textile body is not stretched or tensioned by pulling the tensioning yarns 108 tight to increase the tension on the tensioning yarns 108. Rather, when the tensioning yarns 108 are tensioned, they restrict movement of the textile body 106 to breakup vibration modes based on their own tension. In another example, pulling the tensioning yarns 108 tight may provide some tension to the textile body, due to friction, but to a lesser degree than the tension applied to the tensioning yarns 108.

In aspects, the illustrated implementations 300, 400, 500, and other implementations described herein, of the textile assembly 102 can be assembled by a knitting machine, such as a v-bed flat knitting machine.

To create the textile assembly 102 with a knitting machine such that the tensioning yarns 108 remain free to slide within the textile body 106, the knitting machine can be programmed to bring in vertical yarn feeders and leave them standing in the middle of the fabric during the knitting process. In addition, the knitting machine can shape the edges of the textile assembly to match a shape of the speaker grille. For example, the knitting machine can shape the edges of the textile assembly to match a contour of the speaker grille, including rounded corners in the XY-plane, the XZ-plane, and/or the YZ-plane. Warp knitting machines provide a larger range of gauges and higher knitting speed than weft knitting machines. However, warp knitting machines may require cutting some edges and yarns after knitting. Flat-bed weft knitting machines may provide a "fully-fashioned" swatch, which is a swatch that comes off the knitting machine with finished edges and does not require additional cutting of edges.

In one implementation, the tensioning yarns are inlaid by the knitting machine that forms the textile swatch. If the knitting machine is limited to inlaying yarns at specific angles or is limited to a low number of yarns (e.g., because many yarn feeders are occupied with colored yarns to create a colored pattern on the textile body), additional yarns can be threaded or stitched into the textile body by hand after knitting.

In aspects, a thin yarn is captured within a textile structure, such as a double-jersey knit structure, with no additional bulk that would visually distort the face of the textile body. However, to accommodate thicker yarn, reduce friction between the inlaid tensioning yarns and the textile body, for deliberate visual effect, or to guide additional inlays added by hand, the double jersey can be changed to local areas of separated knitting on the front and back beds of the knitting machine to create channels. Alternatively, the vertically-inlaid tensioning yarns can be captured behind infrequent float stitches. However, using float stitches increases the potential for snagging the inlaid tensioning yarns and may restrict design freedom on the face of the textile body. To create a similar effect for the horizontal yarns, the yarns can be knit once every several wales, with long floats in between. However, using this technique may cause the tensioning yarns to be visible on the front of the textile assembly.

Horizontal tensioning yarns may be inlaid between consecutive courses of double-jersey knitting. Using a multicolor Jacquard pattern can create visual noise to hide the inlaid tensioning yarns. As described above, the horizontal tensioning yarn may be a single yarn carried by one feeder that creates loops on the edges of the textile between successive horizontal inlays. The vertical tensioning yarns may be knitted into the first courses to capture them, and then the feeder for each vertical tensioning yarn remains in a fixed position, paying out yarn, as courses are knit. The ends of the vertical tensioning yarns remain free and accessible above the last courses knit (or edges of the finished textile assembly). These ends (e.g., loop ends 306, 402 and open ends 308, 404) can be used to anchor the textile assembly and restrict its motion under acoustic pressure.

It is noted that, relative to the final textile assembly. "horizontal" and "vertical" may be interchanged. This may be due to a horizontal inlay being introduced as frequently as between every course of normal knitting, whereas vertical inlays are limited by the number of yarn feeders available on the knitting machine. If the textile body is wider than it is tall and thus needs a large number of inlaid tensioning yarns in the y-axis of the textile assembly, the textile assembly may be created with "horizontal" (course-direction) inlays in the knit swatch (e.g., the textile body 106). The restriction on the number of vertical inlays may be relaxed when creating the swatch on a warp knitting machine. However, high numbers of vertical inlays on the warp knitting machine may also restrict textile design possibilities.

The direction of yarn inlays (e.g., horizontal or vertical) relative to a knitting direction of the textile body 106 may not apply after assembly to the acoustic device 104. Inlays at any acute angle relative to the swatch knitting direction can be created if a higher friction is acceptable, or if channels are created and tensioning yarns are threaded into the channels after knitting. Some audio systems may not require inlays in two different directions or in all areas of the textile body 106.

Figures 1, 6:
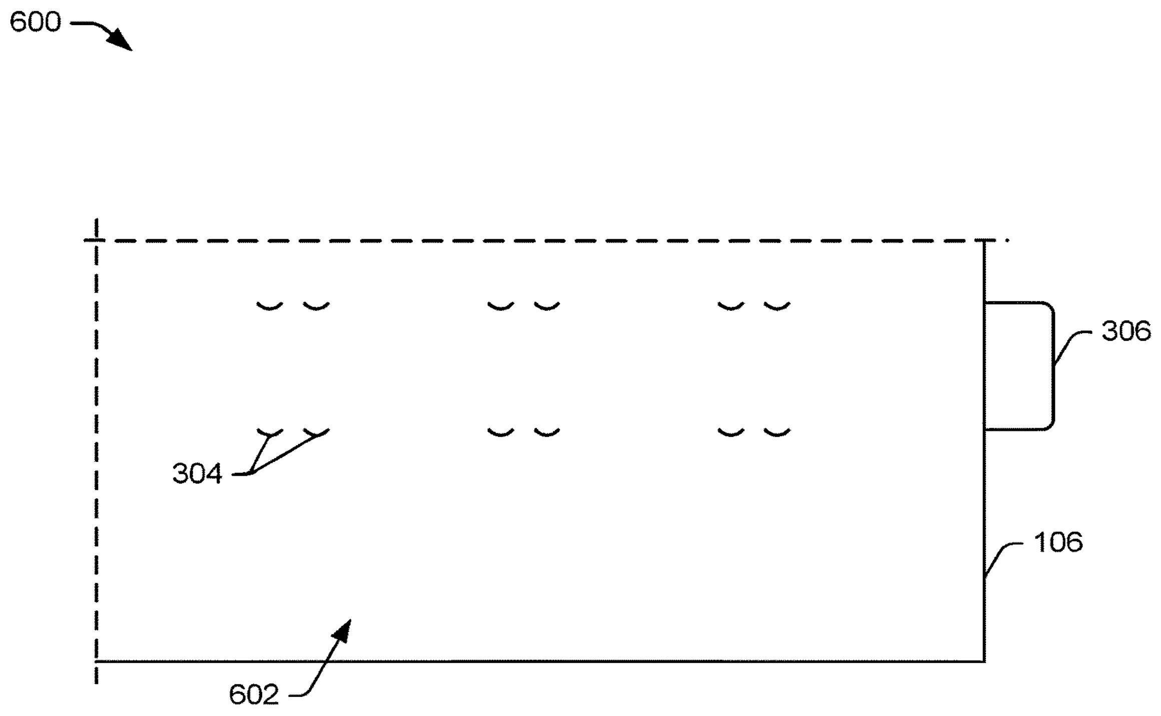
Figures 2, 6:
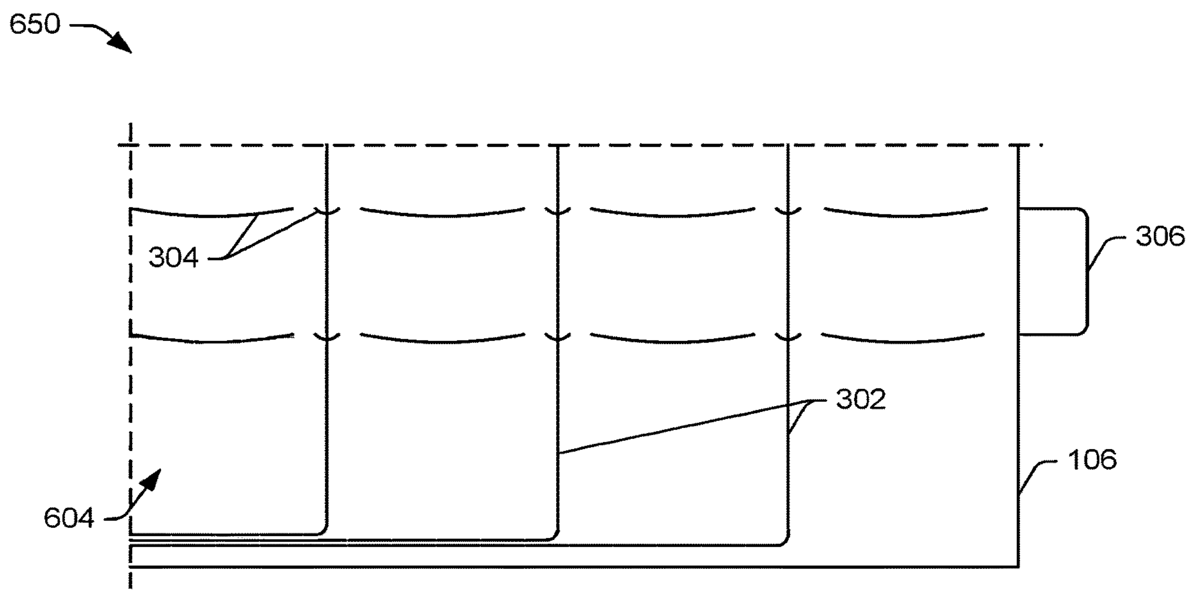

FIGS. 6-1 and 6-2 illustrate front and back views 600, 650, respectively, of an example textile swatch with inlaid tensioning yarns. In aspects, the tensioning yarns 108 can be visible on one side (front face 602 or back face 604) of the textile body 106, rather than being captured between the front and back faces 602, 604 of the textile body 106. As illustrated in FIG. 6-2, the vertically-inlaid tensioning yarns 302 and the horizontally-inlaid tensioning yarns 304 are visible on the back face 604 such that the vertically-inlaid tensioning yarns 302 and the horizontally-inlaid tensioning yarns 304 are not hidden within the textile body 106. Alternatively, the vertically-inlaid tensioning yarns 302 and/or the horizontally-inlaid tensioning yarns 304 can be visible on the front face 602. The vertically-inlaid tensioning yarns 302 and the horizontally-inlaid tensioning yarns 304 may be knitted in with a single stitch, which allows the vertically-inlaid tensioning yarns 302 and the horizontally-inlaid tensioning yarns 304 to be pulled and slidably move for adjustment of position and tension.

FIG. 6-1 shows portions of a horizontal inlay (e.g., horizontally-inlaid tensioning yarn 304) visible on the front face 602 of the textile assembly 102. In FIG. 6-2, the horizontally-inlaid tensioning yarn 304 is substantially visible on the back face 604 of the textile body 106. In addition, a vertical inlay (e.g., vertically-inlaid tensioning yarn 302) is completely visible on the back face 604 and hidden from view on the front face 602.

Figure 7:
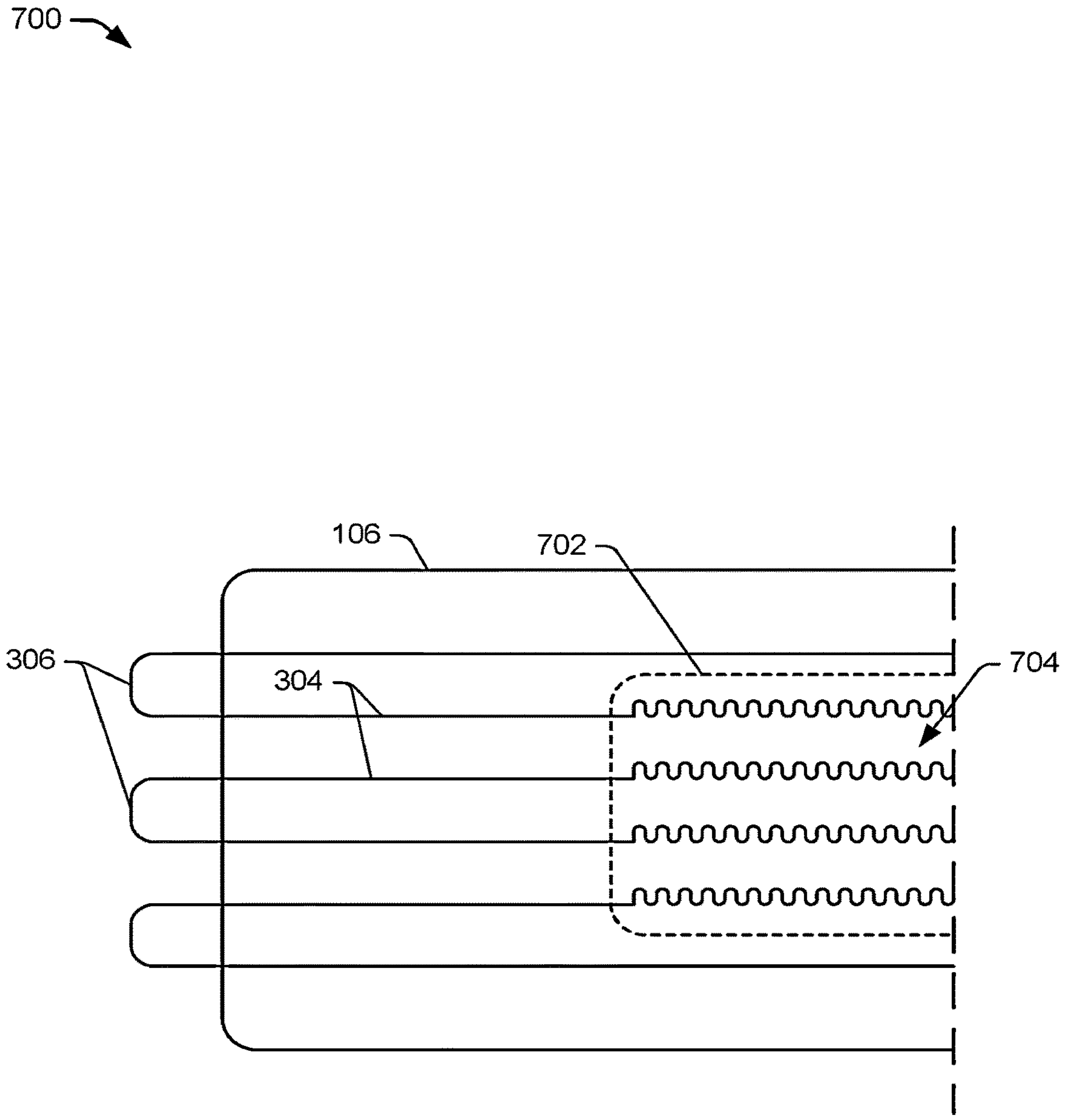
FIG. 7 illustrates an example implementation of a textile assembly with partially-knitted, horizontally-inlaid tensioning yarns.
Figure 8:
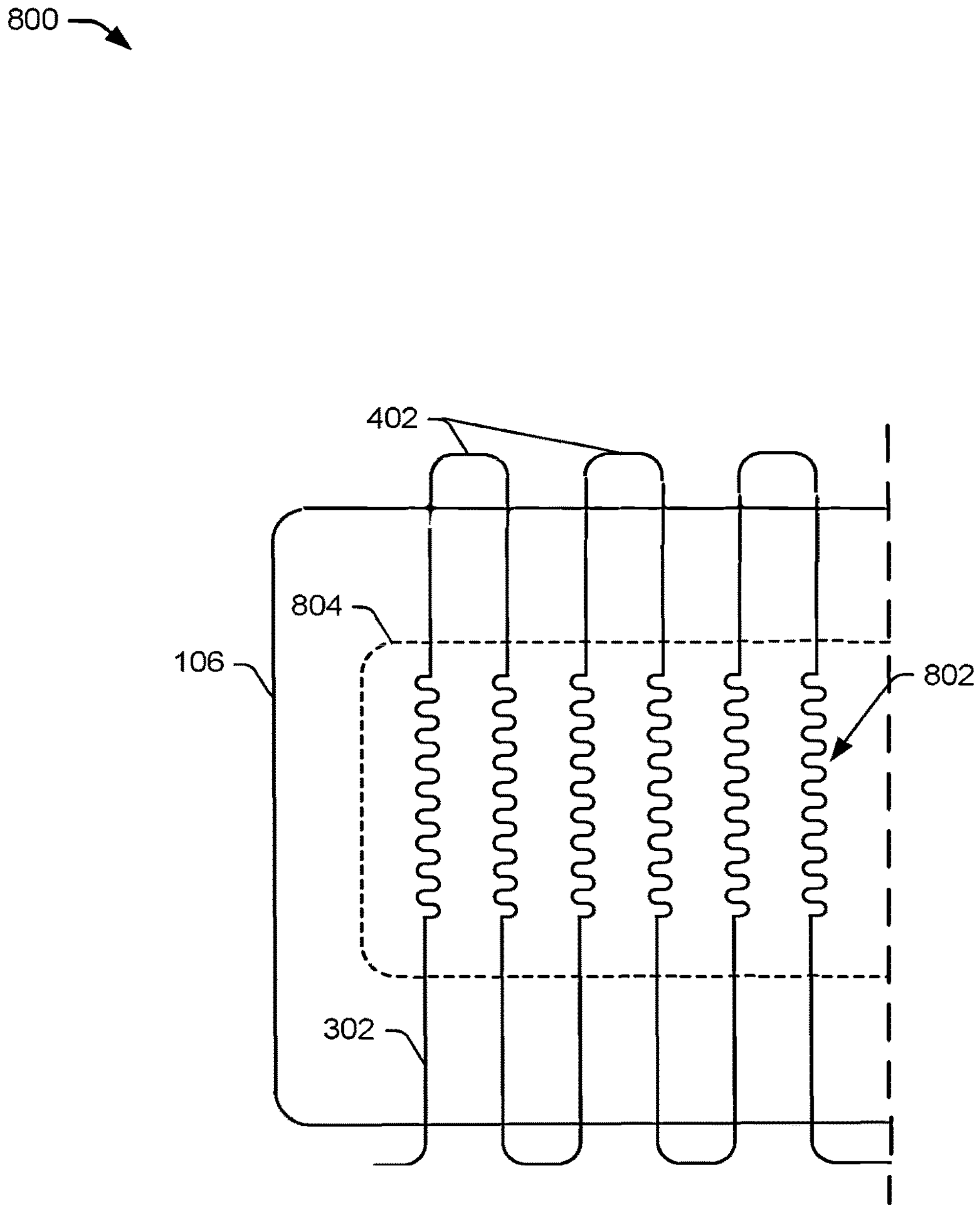
FIG. 8 illustrates an alternative implementation of a textile assembly with vertically-inlaid tensioning yarns.

FIG. 7 illustrates an example implementation 700 of a textile assembly with partially-knitted, horizontally-inlaid tensioning yarns. In contrast to allowing the tensioning yarns, such as the horizontally-inlaid tensioning yarns 304, to be free to slide along their axis in the textile body 106, which allows the greatest range of tension adjustment, the tension adjustment may only be desired on or near the edges of the swatch. To create the textile assembly with tension adjustment on the edges and not in the middle of the textile body 106, the horizontal inlay (e.g., the horizontally-inlaid tensioning yarns 304) can be knit in central sections (e.g., section 702) of one or more courses. Alternatively, particular sections of the horizontal inlay that are slidably movable can be changed by adding multiple stitches and increasing the friction by knitting the horizontal inlay in multiple places, such as knitted portions 704, Knitting one or more portions of the tensioning yarns (e.g., horizontally-inlaid tensioning yarns 304, vertically-inlaid tensioning yarns 302 in FIG. 3) causes those portions to be less adjustable. In some instances, pulling on the tensioning yarns causes areas of the textile body 106, corresponding to the knitted portions, to stretch when a user pulls on the ends of the tensioning yarns, which may cause tension in those areas of the textile body 106. For example, pulling on the loop end 306 of the horizontally-inlaid tensioning yarn 304 may cause tension in the section 702 of the textile body 106 that corresponds to the knitted portion 704. Alternatively or in addition, one or more portions of the vertically-inlaid tensioning yarn(s) 302 in FIG. 3 may be similarly knitted to be less adjustable in the vertical direction, FIG. 8 illustrates an alternative implementation 800 of a textile assembly with vertically-inlaid tensioning yarns. In the illustrated example, the vertically-inlaid tensioning yarns 302 are inlaid in a tortuous path 802 to increase friction in central sections (e.g., central section 804) of the textile body 106. The increased friction of the vertically-inlaid tensioning yarn 302 in the tortuous path 802 reduces the adjustability (e.g., slidable movement) of the vertically-inlaid tensioning yarn 302 in the central section 804, or any other corresponding section of the textile body 106. By introducing such tortuous paths 802 for the vertical inlay, and without knitting the vertically-inlaid tensioning yarn 302 into the textile body 106, the friction is increased but the vertically-inlaid tensioning yarn 302 remains free to slide within the textile body 106. Applying tension to the vertically-inlaid tensioning yarn 302 may also apply tension to the textile body 106, due to the friction, but to a lesser degree than the tension applied to the vertically-inlaid tensioning yarn 302. Alternatively or in addition, the horizontally-inlaid tensioning yarn(s) 304 in FIG. 7 can be similarly inlaid in a tortuous path to increase the friction in the horizontal direction while maintaining slidably freedom of the horizontally-inlaid tensioning yarn(s) 304 within the textile body 106.

Some examples are provided below:

Example 1: A textile assembly comprising: a speaker grille having multiple anchors; a textile body; and a plurality of tensioning yarns, the plurality of tensioning yarns: connected to the textile body, one or more tensioning yarns of the plurality of tensioning yarns: disposed back-and-forth across the textile body at predefined intervals to form a plurality of loop ends that extend beyond opposing edges of the textile body, the loop ends accessible to removably connect to the anchors on the speaker grille to secure the textile body to the speaker grille and enable removal of the textile body from the speaker grille; and configured to slidably move relative to at least a portion of the textile body to enable adjustment of a tension of the one or more tensioning yarns.

Example 2: The textile assembly of example 1, wherein the one or more yarns include multiple tensioning yarns comprising: a first set of tensioning yarns configured to slidably move in a first direction; and a second set of tensioning yarns configured to slidably move in a second direction substantially orthogonal to the first direction.

Example 3: The textile assembly of example 1, wherein the one or more tensioning yarns are hidden between two layers of the textile body.

Example 4: The textile assembly of example 1, wherein the one or more tensioning yarns are configured to slidably move along their entire length relative to the textile body.

Example 5: The textile assembly of example 1, wherein the one or more tensioning yarns include a first portion configured to slidably move relative to the textile body and a second portion that is fixed to the textile body.

Example 6: The textile assembly of example 1, wherein the textile assembly is removably secured to the speaker grille based on the loop ends of the plurality of tensioning yarns being removably connected to the anchors on the speaker grille.

Example 7: The textile assembly of example 1, wherein the tension of the one or more tensioning yarns is adjustable without applying a same tension to the textile body.

Example 8: The textile assembly of example 1, wherein the plurality of tensioning yarns comprise at least one of filaments, fabric yarns, cords, or narrow tapes.

Example 9: The textile assembly of example 1, wherein the plurality of tensioning yarns are connected to the textile body based on being: stitched through the textile body; threaded through the textile body; stitched over by an embroidery machine to be captured on the textile body; threaded through tubes formed by additional fabric stitched or bonded to the textile body; or inlaid within the textile body by a knitting machine.

Example 10: The textile assembly of example 1, wherein the plurality of tensioning yarns includes a set of tensioning yarns that are substantially parallel to one another and separated from each other by a distance within a range of approximately one centimeter to approximately three centimeters.

Example 11: The textile assembly of example 1, wherein the one or more tensioning yarns are inlaid between consecutive courses of double knitting.

Example 12: The textile assembly of example 1, wherein the plurality of tensioning yarns are configured to, based on the tension of the one or more tensioning yarns when the plurality of tensioning yarns are removably connected to the anchors on the speaker grille, dampen vibration of the textile body that is caused by acoustic pressure generated by a speaker-driver component of an acoustic device to which the speaker grille is mounted or by audio input passing through the textile assembly for receipt by an audio sensor of the acoustic device.

Example 13: An apparatus comprising: a speaker driver; a speaker grille having multiple anchors; and a textile assembly removably secured to the speaker grille, the textile assembly comprising: a textile body; and a plurality of tensioning yarns: inlaid within to the textile body, one or more tensioning yarns of the plurality of tensioning yarns: inlaid back-and-forth across the textile body; having loop ends that extend beyond an edge of the textile body between successive inlays and are removably connected to the anchors on the speaker grille to secure the textile assembly to the speaker grille and enable removal of the textile assembly from the speaker grille; and configured to slidably move relative to at least a portion of the textile body to enable adjustment of a tension applied to the one or more tensioning yarns.

Example 14: The apparatus of example 13, wherein the one or more tensioning yarns include a first set of tensioning yarns configured to slidably move in a first direction and a second set of tensioning yarns configured to slidably move in a second direction substantially orthogonal to the first direction.

Example 15: The apparatus of example 13, wherein the one or more tensioning yarns includes a first portion configured to slidably move relative to the textile body and a second portion that is fixed to the textile body.

Example 16: The apparatus of example 13, wherein the one or more tensioning yarns are configured to slidably move along their entire length relative to the textile body.

Example 17: The apparatus of example 13, wherein the plurality of tensioning yarns are hidden between two knitted layers of the textile body.

Example 18: The apparatus of example 13, wherein the tension of the one or more tensioning yarns is adjustable without applying a same tension to the at least a portion of the textile body.

Example 19: The apparatus of example 13, wherein the plurality of tensioning yarns includes at least two tensioning yarns that are substantially orthogonal to one another.

Example 20: The apparatus of example 13, wherein the plurality of tensioning yarns are inlaid between consecutive courses of double knitting.

Example 21: The apparatus of example 13, wherein the plurality of tensioning yarns are inlaid based on a knitting process, a weaving process, or a sewing process.

Example 22: The apparatus of example 13, wherein the plurality of tensioning yarns are configured to, based on the tension of the one or more tensioning yarns that are removably connected to the anchors of the speaker grille, constrain a vibration response of the textile body to the acoustic pressure generated by the speaker-driver component or to audio input passing through the textile assembly for receipt by an audio sensor of the speaker.

CONCLUSION

Although aspects of textile assemblies for speakers, including textile assemblies with inlaid tensioning yarns, and associated apparatuses and methods have been described in language specific to features and/or methods, the subject of the appended claims is not necessarily limited to the specific features or methods described, Rather, the specific features and methods are disclosed as example implementations of the textile assemblies for speakers, including textile assemblies with inlaid tensioning yarns, and associated apparatuses and methods, and other equivalent features and methods are intended to be within the scope of the appended claims. Further, various different aspects are described, and it is to be appreciated that each described aspect can be implemented independently or in connection with one or more other described aspects.

What is claimed is:

1. An acoustic device comprising:
at least one of a speaker or a microphone; and
a textile assembly comprising a textile body and a plurality of tensioning yarns, wherein:
the plurality of tensioning yarns are connected to the textile body,
the plurality of tensioning yarns comprises at least two tensioning yarns that are substantially orthogonal to each other,
one or more tensioning yarns of the plurality of tensioning yarns are disposed across the textile body to form a plurality of ends that extend beyond opposing edges of the textile body and that are accessible to removably connect the textile body to a portion of the acoustic device, and
the one or more tensioning yarns of the plurality of tensioning yarns are configured to slidably move relative to at least a portion of the textile body to enable adjustment of a tension of the one or more tensioning yarns.

2. An acoustic device comprising:
at least one of a speaker or a microphone;
a textile assembly comprising a textile body and a plurality of tensioning yarns, wherein:
the plurality of tensioning yarns are connected to the textile body,
one or more tensioning yarns of the plurality of tensioning yarns are disposed across the textile body to form a plurality of ends that extend beyond opposing edges of the textile body and that are accessible to removably connect the textile body to a portion of the acoustic device, and
the one or more tensioning yarns of the plurality of tensioning yarns are configured to slidably move relative to at least a portion of the textile body to enable adjustment of a tension of the one or more tensioning yarns; and
a housing having multiple anchors, wherein the textile assembly is removably secured to the housing based on the plurality of ends of the plurality of tensioning yarns being removably connected to the multiple anchors on the housing.

3. The acoustic device of claim 2, further comprising a speaker driver, wherein the plurality of tensioning yarns are configured to, based on the tension of the one or more tensioning yarns that are removably connected to the multiple anchors of the housing, constrain a vibration response of the textile body to acoustic pressure generated by the speaker driver or to audio input passing through the textile assembly for receipt by an audio sensor of the acoustic device.

4. The acoustic device of claim 2, wherein the housing of the acoustic device includes a speaker grille.

5. The acoustic device of claim 2, wherein the multiple anchors are protrusions formed around a periphery of the housing.

6. The acoustic device of claim 2, wherein the multiple anchors are protrusions formed on an interior surface of the housing.

7. The acoustic device of claim 1, wherein the one or more tensioning yarns of the plurality of tensioning yarns are disposed back-and-forth across the textile body at predefined intervals.

8. An acoustic device comprising:
at least one of a speaker or a microphone; and
a textile assembly comprising a textile body and a plurality of tensioning yarns, wherein:
the plurality of tensioning yarns are connected to the textile body,
one or more tensioning yarns are hidden between two layers of the textile body;
the one or more tensioning yarns of the plurality of tensioning yarns are disposed across the textile body to form a plurality of ends that extend beyond opposing edges of the textile body and that are accessible to removably connect the textile body to a portion of the acoustic device, and the one or more tensioning yarns of the plurality of tensioning yarns are configured to slidably move relative to at least a portion of the textile body to enable adjustment of a tension of the one or more tensioning yarns.

9. The acoustic device of claim 1, wherein the one or more tensioning yarns are configured to slidably move along their entire length relative to the textile body.

10. The acoustic device of claim 1, wherein the one or more tensioning yarns include a first portion configured to slidably move relative to the textile body and a second portion that is fixed to the textile body.

11. The acoustic device of claim 1, wherein the tension of the one or more tensioning yarns is adjustable without applying a same tension to the textile body.

12. The acoustic device of claim 1, wherein the plurality of tensioning yarns are connected to the textile body based on being:

stitched through the textile body;

threaded through the textile body;

stitched over by an embroidery machine to be captured on the textile body;

threaded through tubes formed by additional fabric stitched or bonded to the textile body; or inlaid within the textile body by a knitting machine.

13. The acoustic device of claim 1, wherein the plurality of tensioning yarns includes a set of tensioning yarns that are substantially parallel to one another and separated from each other by a distance within a range of approximately one centimeter to approximately three centimeters.

14. The acoustic device of claim 1, wherein the one or more tensioning yarns are inlaid between consecutive courses of double knitting.

15. The acoustic device of claim 1, further comprising a housing and a speaker driver, wherein the plurality of tensioning yarns are configured to, based on the tension of the one or more tensioning yarns when the plurality of tensioning yarns that are removably connected to anchors on the housing, dampen vibration of the textile body that is caused by acoustic pressure generated by the speaker driver of the acoustic device to which the housing is mounted or by audio input passing through the textile assembly for receipt by an audio sensor of the acoustic device.

16. The acoustic device of claim 1, wherein the plurality of tensioning yarns are inlaid within the textile body, and wherein the plurality of ends extending beyond the opposing edges of the textile body are disposed between successive inlays of the one or more tensioning yarns.

17. The acoustic device of claim 1, wherein the plurality of tensioning yarns are hidden between two knitted layers of the textile body.

18. The acoustic device of claim 1, wherein the plurality of tensioning yarns comprise at least one of filaments, fabric yarns, and narrow tapes.

19. The acoustic device of claim 1, wherein the plurality of tensioning yarns are connected to the textile body based on being inlaid within the textile body, and wherein the plurality of tensioning yarns are inlaid based on at least one of a knitting process, a weaving process, and a sewing process.

* * * * *